(12) United States Patent
Tang

(10) Patent No.: US 11,252,566 B2
(45) Date of Patent: Feb. 15, 2022

(54) METHOD AND DEVICE FOR DETERMINING SECURITY ALGORITHM, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/885,108

(22) Filed: May 27, 2020

(65) Prior Publication Data
US 2020/0288321 A1    Sep. 10, 2020

Related U.S. Application Data

(63) Continuation of application No. PCT/CN2018/077022, filed on Feb. 23, 2018.

(51) Int. Cl.
| | | |
|---|---|---|
| *H04W 12/106* | (2021.01) | |
| *H04W 76/19* | (2018.01) | |
| *H04W 76/27* | (2018.01) | |
| *H04W 68/00* | (2009.01) | |

(52) U.S. Cl.
CPC ....... *H04W 12/106* (2021.01); *H04W 68/005* (2013.01); *H04W 76/19* (2018.02); *H04W 76/27* (2018.02)

(58) Field of Classification Search
CPC ............. H04W 12/1006; H04W 76/19; H04W 68/005; H04W 76/27
See application file for complete search history.

(56) References Cited

U.S. PATENT DOCUMENTS

| | | | | |
|---|---|---|---|---|
| 2011/0306355 A1* | 12/2011 | Wigren | ................... | G01S 5/021 |
| | | | | 455/456.1 |
| 2014/0050112 A1* | 2/2014 | Muniz Garcia | ........... | G01S 5/12 |
| | | | | 370/252 |
| 2016/0249210 A1* | 8/2016 | Chang | ............. | H04W 12/04033 |
| 2017/0034865 A1* | 2/2017 | Jung | ...................... | H04W 76/18 |
| 2017/0339612 A1* | 11/2017 | Quan | .................... | H04W 76/27 |
| 2018/0206080 A1* | 7/2018 | Chen | ...................... | H04W 4/50 |

(Continued)

FOREIGN PATENT DOCUMENTS

| | | |
|---|---|---|
| CN | 102223632 A | 10/2011 |
| CN | 103888936 A | 6/2014 |

(Continued)

OTHER PUBLICATIONS

International Search Report dated Nov. 23, 2018 of PCT/CN2018/077022 (4 pages).

(Continued)

*Primary Examiner* — Michael R Vaughan
(74) *Attorney, Agent, or Firm* — Perkins Coie LLP

(57) ABSTRACT

Disclosed are a method and device for determining a security algorithm, and a computer storage medium. The method comprises: a first base station configures an RAN notification area for a terminal, wherein all base stations in the RAN notification area at least support a first security algorithm; the first base station configures the terminal for the first security algorithm.

3 Claims, 6 Drawing Sheets

---

A first base station configures a radio access network (RAN) notification area for a terminal, herein all base stations in the RAN notification area support at least a first security algorithm  — 101

The first base station configures the first security algorithm for the terminal so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message  — 102

(56) References Cited

U.S. PATENT DOCUMENTS

| | | | | |
|---|---|---|---|---|
| 2019/0037634 A1* | 1/2019 | Kadiri | .................. | H04W 12/003 |
| 2019/0052607 A1* | 2/2019 | Ohlsson | ................ | H04W 76/28 |
| 2019/0059119 A1* | 2/2019 | Hapsari | ................ | H04W 76/10 |
| 2019/0246260 A1* | 8/2019 | Edge | ........................ | H04L 51/38 |
| 2019/0281524 A1* | 9/2019 | Rugeland | ............. | H04W 36/30 |
| 2019/0320316 A1* | 10/2019 | Mildh | ............... | H04W 12/0017 |
| 2019/0357109 A1* | 11/2019 | Hong | .................... | H04W 76/19 |
| 2020/0037345 A1* | 1/2020 | Ryoo | ................ | H04W 72/1268 |
| 2020/0260283 A1* | 8/2020 | Hu | ........................ | H04W 76/27 |

FOREIGN PATENT DOCUMENTS

| | | | | |
|---|---|---|---|---|
| CN | 201711050848 A | * | 10/2017 | |
| CN | 109644354 A | | 4/2019 | |
| CN | 110149630 | * | 8/2019 | ............ H04W 12/02 |
| EP | 1895706 A1 | | 3/2008 | |
| KR | 20170039247 A | | 4/2017 | |
| WO | WO-2018230980 A1 | * | 12/2018 | ............ H04W 12/06 |
| WO | WO-2019085908 A1 | * | 5/2019 | ............ H04W 12/08 |

OTHER PUBLICATIONS

3GPP TSG-RAN WG2 meeting #99bis, Prague, Czech Republic, Oct. 9-13, 2017—R2-1710001—ETSI MCC, Report of 3GPP TSG RAN2#99 meeting, Berlin, Germany (235 pages).

EPO, Extended European Search Report for European Patent Application No. 18906730.9, dated Mar. 16, 2021. 12 pages.

Huawei et al., "Key Handling at Transitions between RRC-Inactive and RRC-Connected states", 3GPP TSG SA WG3 (Security) Meeting #90bis, S3-180638, Feb. 26, 2018. 3 pages.

InterDigital Inc., "Security Aspects of Connection Control", 3GPP RAN WG2 Meeting #101, R2-1802813, Feb. 26, 2018. 6 pages.

InterDigital Inc., "Security Aspects of Connection Control", 3GPP RAN WG2 NR Ad Hoc 1801, R2-1801108, Jan. 22, 2018. 6 pages.

IPA, Examination Report No. 1 for Australian Patent Application No. 2018409908, dated May 10, 2021. 4 pages.

KIPO, Notification of Reason for Refusal for Korean Patent Application No. 10-2020-7024441, dated Apr. 28, 2021. 8 pages with English translation.

Vivo, "Security aspects in RRC Inactive", 3GPP TSG-RAN WG2 NR Ad Hoc 1801, R2-1800868, Jan. 22, 2018. 3 pages.

CNIPA, Decision to Grant for Chinese Patent Application No. 202010302726.6, dated Sep. 8, 2021. 8 pages with English translation.

CNIPA, First Office Action for Chinese Patent Application No. 202010302726.6, dated Jun. 30, 2021. 12 pages with English translation.

IPI, Examination Report for Indian Patent Application No. 202017027272, dated Jun. 23, 2021. 6 pages with English translation.

3GPP RAN WG2 Meeting #101—Athens, Greece, Feb. 26-Mar. 2, 2018—R2-1802813 (Resubmission of R2-1801108)—InterDigital Inc., Security Aspects of Connection Control (6 pages).

3GPP TSG SA WG3 (Security) Meeting #90bis Feb. 26-Mar. 2, 2018, San Diego, USA—S3-180638—Huawei, Hisilicon, Key Handling at Transitions between ARC-Inactive and ARC-Connected states (3 pages).

3GPP TSG-RAN WG2 NR Ad hoc 1801—Vancouver, Canada, 22nd—Vancouver, Canada, 22nd—R2-1800868 (Resubmission of R2-1712772)—vivo Security aspects in RRC Inactive (3 pages).

Supplemental Partial European Search Report dated Dec. 9, 2020 of European Patent Application No. 18906730.9 (14 pages).

First Office Action of Japanese Application No. 2020-543199 dated Oct. 29, 2021 with translation (8 pages).

Notice of Allowance of Korean Patent Application No. 10-2020-7024441 dated Sep. 27, 2021 with translation (4 pages).

* cited by examiner

METHOD AND DEVICE FOR DETERMINING SECURITY ALGORITHM, AND COMPUTER STORAGE MEDIUM

CROSS REFERENCE TO RELATED APPLICATION

This application is a continuation application of International Application No. PCT/CN2018/077022 filed on Feb. 23, 2018, and the entire disclosure of the application is hereby incorporated by reference.

TECHNICAL FIELD

The invention relates to a field of wireless communication technology, in particular to a method for determining a security algorithm, a device and a computer storage medium.

BACKGROUND

In order to satisfy people's pursuit of speed, delay, high-speed mobility, and energy efficiency, and due to diversity and complexity of services in a future life, the 3rd Generation Partnership Project (3GPP) International Standards Organization began to research and develop the fifth Generation (5-Generation, 5G) mobile communication technology.

Main application scenarios of the 5G mobile communication technology are: Enhance Mobile Broadband (eMBB), Ultra Reliable Low Latency Communication (URLLC), and massive Machine Type Communication (mMTC).

In a 5G network environment, in order to reduce air interface signaling, quickly resume a wireless connection and quickly resume a data service, a new Radio Resource Control (RRC) state, i.e., an RRC_INACTIVE state, is defined. This state is different from an RRC_IDLE state and an RRC_CONNECTED state.

When a User Equipment (UE) is in an RRC_INACTIVE state, a network side will configure a paging area of a Radio Access Network (RAN) for the UE through a dedicated signaling, and the paging area of RAN may be one cell or multiple cells. When the UE moves in this area, the UE does not need to notify the network side, and follows a mobility behavior under idle, i.e. a cell selection reselection principle. When the UE moves out of the paging area configured by the RAN, it will trigger the UE to resume an RRC connection and reacquire a paging area configured by the RAN. When the UE has downlink data arriving, a base station (such as a gNB) that maintains a connection between the RAN and a Core Network for the UE will trigger all cells in the paging area of the RAN to send paging messages to the UE, so that the UE in the INACTIVCE state may resume the RRC connection and receive data.

Therefore, the UE enters the RRC connected state from the INACTIVE state in the following three cases.

First, when the UE has downlink data arriving, the network side initiates a paging of a RAN side and prompts the UE to enter the connected state.

Second, the UE itself initiates a RAN location area update, such as a periodic RAN location update or a cross-area location update.

Third, the UE has a demand for uplink data transmission, which urges the UE to enter the connected state.

In any case, the UE needs to initiate a random access procedure with a currently serving cell to enter the connected state. Specifically, firstly, an RRC connection resume request message is sent in MSG3 in the random access procedure. After receiving the request, a serving base station acquires UE context from an anchor base station according to a UE context identifier, then establishes SRB1, and performs an integrity protection on an RRC connection resume message to send to the UE, thereby resumes the RRC connection. However, since a key used in an original AS context is a key generated by an original base station (i.e., the anchor base station) according to an algorithm selected for the UE, this algorithm may not be supported by the current serving base station, so the current serving base station may not perform the integrity protection on the RRC connection resume message. How the serving base station handles current behaviors to ensure a success of RRC connection resume is a problem to be solved.

SUMMARY

In order to solve the above technical problems, implementations of the present disclosure provide a method for determining a security algorithm, a device and a computer storage medium.

An implementation of the present disclosure provides a method for determining a security algorithm, including: configuring, by a first base station, a RAN notification area for a terminal, wherein all base stations in the RAN notification area support at least a first security algorithm; and configuring, by the first base station, the terminal for the first security algorithm so that a second base station in the RAN notification area may adopt the first security algorithm to perform an integrity security protection on an RRC connection resume message, and the terminal may adopt the first security algorithm to perform an integrity protection verification on the RRC connection resume message.

In an implementation of the present disclosure, configuring, by the first base station, the terminal for the first security algorithm, includes: determining, by the first base station, whether the terminal supports the first security algorithm; if the terminal supports the first security algorithm, then the first base station configures the terminal for the first security algorithm.

A method for determining the security algorithm provided by an implementation of the invention, including: determining, by a first base station, a first security algorithm currently supported by a terminal; and configuring, by the first base station, a RAN notification area for the terminal based on the first security algorithm, wherein all base stations in the RAN notification area support at least the first security algorithm, so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message.

A method for determining a security algorithm provided by an implementation of the invention, including: determining, by a second base station, whether the second base station supports a security algorithm of a terminal; if the second base station does not support the security algorithm of the terminal, adopting a second security algorithm to perform an integrity security protection on an RRC connection resume message, and sending the RRC connection resume message to the terminal, so that the terminal adopts the second security algorithm to perform an integrity protection verification on the RRC connection resume message; wherein the second security algorithm is a security algorithm supported by all base stations.

In an implementation of the present disclosure, determining, by the second base station whether the second base station supports the security algorithm of the terminal, includes: receiving, by the second base station, the RRC connection resume request message sent by the terminal, and acquiring context information of the terminal from the first base station; determining, by the second base station, whether the second base station supports the security algorithm of the terminal according to the context information of the terminal.

In an implementation of the present disclosure, the second security algorithm is specified by a protocol, configured by an RRC signaling, or broadcasted through SI.

A method for determining a security algorithm provided by an implementation of the invention, including: determining, by a base station whether the base station supports a security algorithm of a terminal; if the base station does not support the security algorithm of the terminal, sending, an RRC connection establishment message to the terminal in order for the terminal to reestablish an RRC connection.

In an implementation of the present disclosure, determining, by the second base station whether the second base station supports the security algorithm of the terminal, includes: receiving, by the base station, an RRC connection resume request message sent by the terminal and acquiring context information of the terminal from the another base station; determining, by the second base station whether the second base station supports the security algorithm of the terminal according to the context information of the terminal.

A device for determining a security algorithm provided by an implementation of the invention, including: a first configuration unit, configured to configure a RAN notification area for a terminal, wherein all base stations in the RAN notification area support at least a first security algorithm; and a second configuration unit, configured to configure the terminal for the first security algorithm so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message.

In an implementation of the invention, the device further includes: a determination unit, configured to determine whether the terminal supports the first security algorithm; wherein if the terminal supports the first security algorithm, the second configuration unit configures the terminal for the first security algorithm.

A device for determining a security algorithm provided by an implementation of the invention, including: a determination unit, configured to determine a first security algorithm currently supported by a terminal; and a configuration unit, configured to configure a RAN notification area for the terminal based on the first security algorithm, wherein all base stations in the RAN notification area support at least the first security algorithm, so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message.

A device for determining an security algorithm provided by an implementation of the invention, including: a determination unit, configured to determine whether a second base station supports a security algorithm of a terminal; and an integrity security protection unit, configured to adopt a second security algorithm to perform an integrity security protection on an RRC connection resume message and send the RRC connection resume message to the terminal if the second base station does not support the security algorithm of the terminal, so that the terminal adopts the second security algorithm to perform an integrity protection verification on the RRC connection resume message; wherein the second security algorithm is a security algorithm supported by all base stations.

In an implementation of the invention, the device further includes: a receiving unit, configured to receive the RRC connection resume request message sent by the terminal and acquire context information of the terminal from a first base station; wherein the determination unit is configured to determine whether the second base station supports the security algorithm of the terminal according to the context information of the terminal.

In an implementation of the present disclosure, the second security algorithm is specified by a protocol, configured by an RRC signaling, or broadcasted through SI.

A device for determining a security algorithm provided by an implementation of the present disclosure, including: a determination unit, configured to determine whether a base station supports a security algorithm of a terminal; and a sending unit, configured to send an RRC connection establishment message to the terminal if the base station does not support the security algorithm of the terminal, in order for the terminal to reestablish the RRC connection.

In an implementation of the invention, the device further includes: a receiving unit, configured to receive an RRC connection resume request message sent by the terminal and acquire context information of the terminal from a first base station; wherein the determination unit is configured to determine whether the second base station supports the security algorithm of the terminal according to the context information of the terminal.

A computer storage medium provided by an implementation of the present disclosure, storing computer executable instructions thereon, and when the computer executable instructions are executed by a processor, the method for determining the above-mentioned security algorithm is implemented.

BRIEF DESCRIPTION OF DRAWINGS

The drawings described here are for the purpose of providing a further understanding of the present disclosure and form a part of the present application. The illustrative implementations of the present disclosure and the description thereof are for the purpose of explaining the present disclosure and are not intended to unduly limit the present disclosure. In the drawings.

DETAILED DESCRIPTION

To understand features and technical contents of implementations of the present disclosure in more detail, the implementation of the implementations of the present disclosure will be described in detail below with reference to the drawings, which are used for reference only and are not intended to limit the implementations of the present disclosure.

The technical solutions of implementations of the present disclosure are mainly applied to a 5G mobile communication system. Of course, the technical solutions of implementations of the present disclosure are not limited to a 5G mobile communication system, but may also be applied to other types of mobile communication systems. The following describes main application scenarios in the 5G mobile communication system:

1) eMBB scenario: eMBB aims at users' access to multimedia content, service and data, and demands for this service are growing rapidly. Because the eMBB may be deployed in different scenarios, such as indoor, urban and rural areas, and capabilities and requirements for this service differ greatly, the service should be analyzed in combination with specific deployment scenarios.

2) URLLC scenario: typical applications of URLLC include: industrial automation, power automation, telemedicine operation, traffic safety guarantee, etc.

3) mMTC scenario: typical characteristics of mMTC include: high connection density, small data volume, delay insensitive services, low cost and long service life of modules, etc.

The following describes three RRC states in a 5G network environment:

1) RRC_IDLE state: mobility is based on cell selection reselection by a UE, paging is initiated by a CN, and a paging area is configured by the CN. UE AS context does not exist on a base station side. An RRC connection does not exist.

2) RRC_CONNECTED state: an RRC connection exists, and UE AS context exists on a base station and a UE. A network side knows a location of the UE at a specific cell level. Mobility is a mobility controlled by the network side. Unicast data may be transmitted between the UE and the base station.

3) RRC_INACTIVE State: mobility is based on cell selection reselection by a UE, a connection exists between a CN and a RAN, UE AS context exists on a base station, paging is triggered by the RAN, a RAN-based paging area is managed by the RAN, and a network side knows a location of a UE at a RAN-based paging area level.

Figure 1:
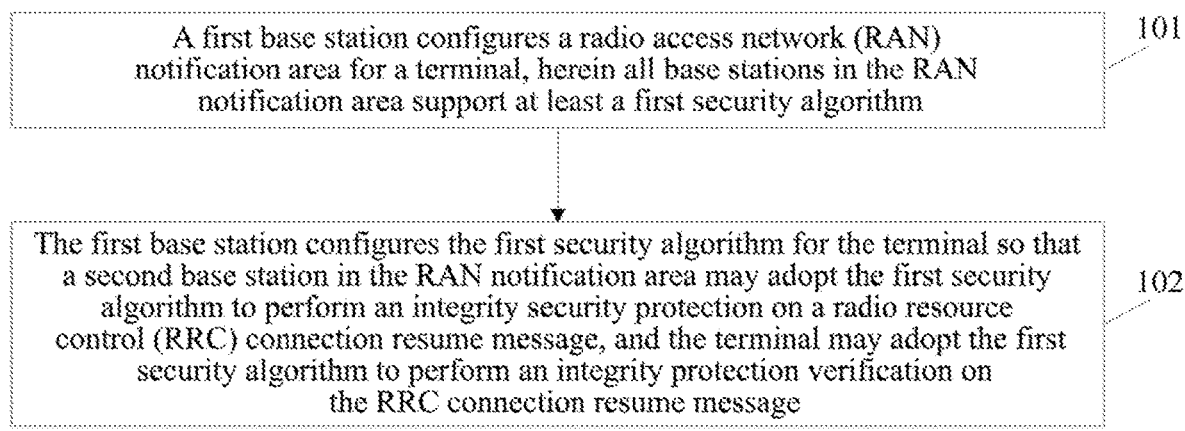
FIG. 1 is a first flowchart of a method for determining a security algorithm according to an implementation of the present disclosure.

FIG. 1 is a first flowchart of a method for determining a security algorithm according to an implementation of the present disclosure. As shown in FIG. 1, the method for determining the security algorithm includes the following acts.

Act 101: a first base station configures a radio access network (RAN) notification area for a terminal, herein all base stations in the RAN notification area support at least a first security algorithm.

In an implementation of the present disclosure, the first base station is an anchor base station, and a base station currently serving the terminal is called a second base station, relative to the first base station.

In an implementation of the present disclosure, a network side negotiates the security algorithm in advance. When the anchor base station configures the terminal for the RAN notification area, the anchor base station selects the security algorithm (i.e., the first security algorithm) supported by all base stations in the RAN notification area to configure for the terminal.

It should be understood that a base station corresponds to a cell, and a place where a base station exists may be understood as a cell.

Act 102: the first base station configures the terminal for the first security algorithm so that the second base station in the RAN notification area may adopt the first security algorithm to perform an integrity security protection on a radio resource control (RRC) connection resume message, and the terminal may adopt the first security algorithm to perform an integrity protection verification on the RRC connection resume message.

In one implementation mode, the first base station determines whether the terminal supports the first security algorithm; if the terminal supports the first security algorithm, the first base station configures the terminal for the first security algorithm.

In an implementation of the present disclosure, the anchor base station selects a security algorithm supported by all the base stations in the RAN notification areas to perform a security algorithm reconfiguration for the terminal. If a current security algorithm of the terminal is a security algorithm supported by all RAN notification areas, the terminal may not be reconfigured with the security algorithm.

Figure 2:
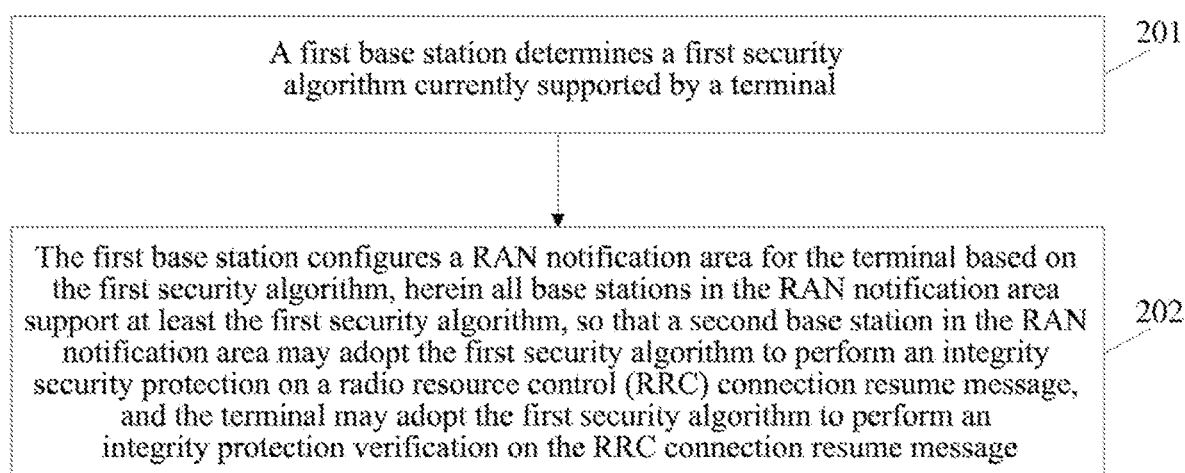
FIG. 2 is a second flowchart of a method for determining a security algorithm according to an implementation of the present disclosure.

FIG. 2 is a second flowchart of a method for determining a security algorithm according to an implementation of the present disclosure. As shown in FIG. 2, the method for determining the security algorithm includes the following acts.

Act 201: a first base station determines a first security algorithm currently supported by a terminal.

In an implementation of the present disclosure, the first base station is an anchor base station, and a base station currently serving the terminal is called a second base station, relative to the first base station.

In an implementation of the invention, a network side negotiates the security algorithm in advance. When the anchor base station configures the RAN notification area for the terminal, selected base stations all support the first security algorithm of the terminal.

Act 202: the first base station configures a RAN notification area for the terminal based on the first security algorithm, herein all base stations in the RAN notification area support at least the first security algorithm, so that the second base station in the RAN notification area may adopt the first security algorithm to perform an integrity security protection on a radio resource control (RRC) connection resume message, and the terminal may adopt the first security algorithm to perform an integrity protection verification on the RRC connection resume message.

Figure 3:
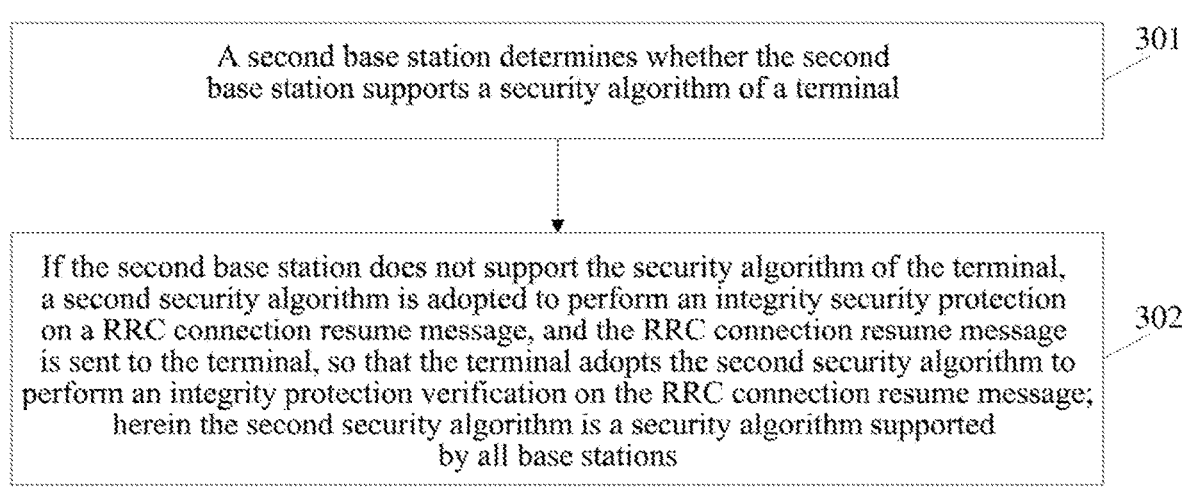
FIG. 3 is a third flowchart of a method for determining a security algorithm according to an implementation of the present disclosure.

FIG. 3 is a third flowchart of a method for determining a security algorithm according to an implementation of the present disclosure. As shown in FIG. 3, the method for determining the security algorithm includes the following acts.

Act 301: a second base station determines whether the second base station supports a security algorithm of a terminal.

In an implementation of the present disclosure, a first base station is an anchor base station, and a base station currently serving the terminal is called a second base station, relative to the first base station.

In a specific implementation, the second base station receives an RRC connection resume request message sent by the terminal and acquires context information of the terminal from the first base station; the second base station determines whether the second base station supports the security algorithm of the terminal according to the context information of the terminal.

Act 302: if the second base station does not support the security algorithm of the terminal, a second security algorithm is adopted to perform an integrity security protection on the RRC connection resume message, and the RRC connection resume message is sent to the terminal, so that the terminal adopts the second security algorithm to perform an integrity protection verification on the RRC connection resume message; herein the second security algorithm is a security algorithm supported by all base stations.

In an implementation of the invention, the second security algorithm is a default fallback algorithm of the terminal and all base stations, and if a current security algorithm of the base station or the terminal is not supported, the default fallback algorithm is adopted for a security protection or verification.

In one implementation mode, the second security algorithm is specified by a protocol, configured by an RRC signaling, or broadcasted through SI.

Figure 4:
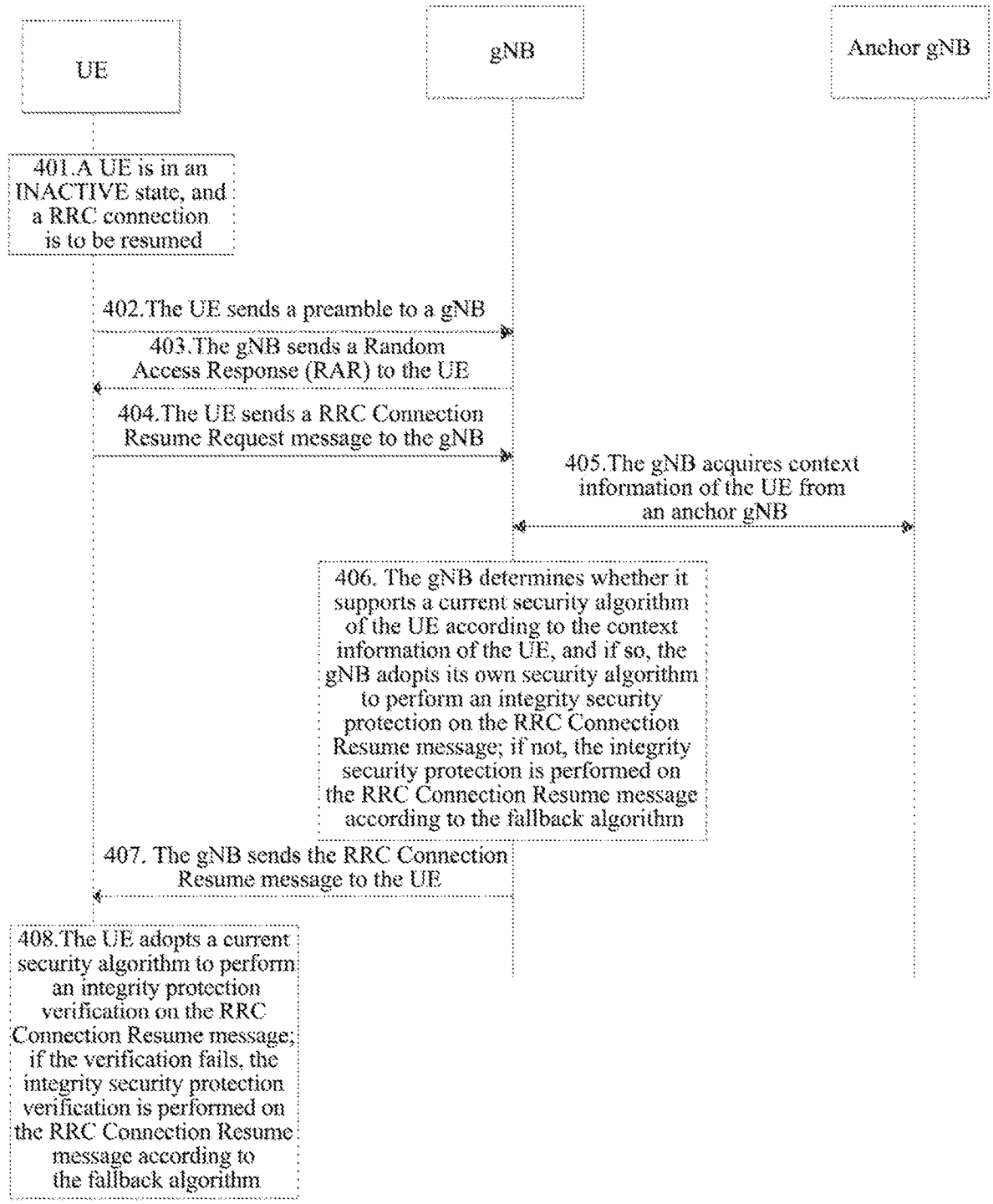
FIG. 4 is a fourth flowchart of a method for determining a security algorithm according to an implementation of the present disclosure.

FIG. 4 is a fourth flowchart of a method for determining a security algorithm according to an implementation of the present disclosure. As shown in FIG. 4, the method for determining the security algorithm includes the following acts.

Act 401: a UE is in an INACTIVE state, and an RRC connection is to be resumed.

Act 402: the UE sends a preamble to a gNB.

Act 403: the gNB sends a Random Access Response (RAR) to the UE.

Act 404: the UE sends an RRC Connection Resume Request message to the gNB.

Act 405: the gNB acquires context information of the UE from an anchor gNB.

Act 406: the gNB determines whether it supports a current security algorithm of the UE according to the context information of the UE, and if so, the gNB adopts its own security algorithm to perform an integrity security protection on the RRC Connection Resume message; if not, the integ-rity security protection is performed on the RRC Connection Resume message by using the fallback algorithm.

Act 407: the gNB sends the RRC Connection Resume message to the UE.

Act 408: the UE adopts the current security algorithm to perform an integrity protection verification on the RRC Connection Resume message; if the verification fails, the integrity security protection verification is performed on the RRC Connection Resume message according to the fallback algorithm.

Figure 5:
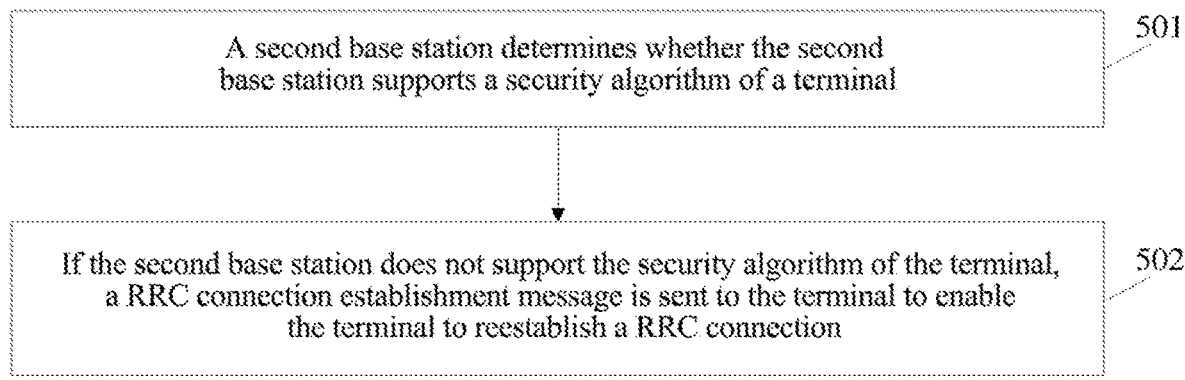
FIG. 5 is a fifth flowchart of a method for determining a security algorithm according to an implementation of the present disclosure.

FIG. 5 is a fifth flowchart of a method for determining a security algorithm according to an implementation of the present disclosure. As shown in FIG. 5, the method for determining the security algorithm includes the following acts:

Act 501: a second base station determines whether the second base station supports a security algorithm of a terminal.

In an implementation of the present disclosure, a first base station is an anchor base station, and a base station currently serving the terminal is called the second base station, relative to the first base station.

In a specific implementation, the second base station receives an RRC connection resume request message sent by the terminal and acquires context information of the terminal from the first base station; the second base station determines whether the second base station supports the security algorithm of the terminal according to the context information of the terminal.

Act 502: if the second base station does not support the security algorithm of the terminal, an RRC connection establishment message is sent to the terminal so that the terminal reestablishes an RRC connection.

Figure 6:
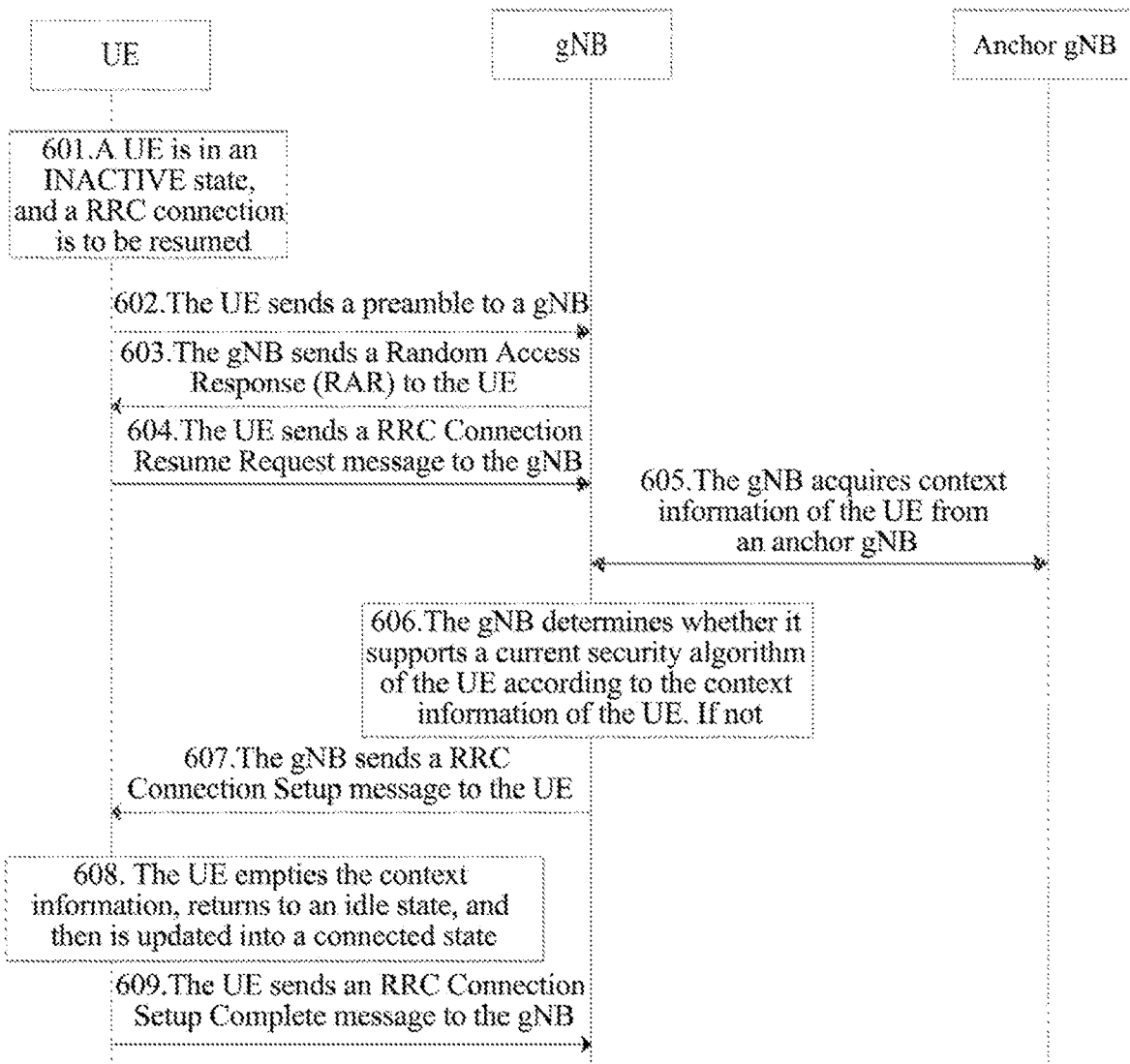
FIG. 6 is a sixth flowchart of a method for determining a security algorithm according to an implementation of the present disclosure.

FIG. 6 is a sixth flowchart of a method for determining a security algorithm according to an implementation of the present disclosure. As shown in FIG. 6, the method for determining the security algorithm includes the following acts.

Act 601: a UE is in an INACTIVE state, and an RRC connection is to be resumed.

Act 602: the UE sends a preamble to a gNB.

Act 603: the gNB sends a Random Access Response (RAR) to the UE.

Act 604: the UE sends an RRC Connection Resume Request message to the gNB.

Act 605: the gNB acquires context information of the UE from an anchor gNB.

Act 606: the gNB determines whether it supports a current security algorithm of the UE according to the context information of the UE. If not, act 607 is executed.

Act 607: the gNB sends an RRC Connection Setup message to the UE.

Act 608: the UE empties the context information, returns to an idle state, and then is updated into a connected state.

Act 609: the UE sends an RRC Connection Setup Complete message to the gNB.

In the technical solution of an implementation of the present disclosure, 1) a first base station configures a RAN notification area for a terminal, wherein all base stations in the RAN notification area support at least a first security algorithm; the first base station configures the terminal for the first security algorithm so that a second base station in the RAN notification area may adopt the first security algorithm to perform an integrity security protection on an RRC connection resume message, and the terminal may adopt the first security algorithm to perform an integrity protection verification on the RRC connection resume message. 2) A first base station determines a first security algorithm currently supported by a terminal; the first base station configures a RAN notification area for the terminal based on the first security algorithm, wherein all base stations in the RAN notification area support at least the first security algorithm, so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message. 3) A second base station determines whether the second base station supports a security algorithm of a terminal; if the second base station does not support the security algorithm of the terminal, a second security algorithm is adopted to perform an integrity security protection on an RRC connection resume message, and the RRC connection resume message is sent to the terminal, so that the terminal adopts the second security algorithm to perform an integrity protection verification on the RRC connection resume message; wherein the second security algorithm is a security algorithm supported by all base stations. 4) A second base station determines whether the second base station supports a security algorithm of a terminal; if the second base station does not support the security algorithm of the terminal, an RRC connection establishment message is sent to the terminal to enable the terminal to reestablish an RRC connection. By adopting the technical solution of an implementation of the present disclosure, a success rate of integrity protection verification in an RRC connection resume request process is ensured through a security algorithm (i.e., a first security algorithm) or a fallback algorithm (i.e., a second security algorithm) negotiated through a network.

Figure 7:
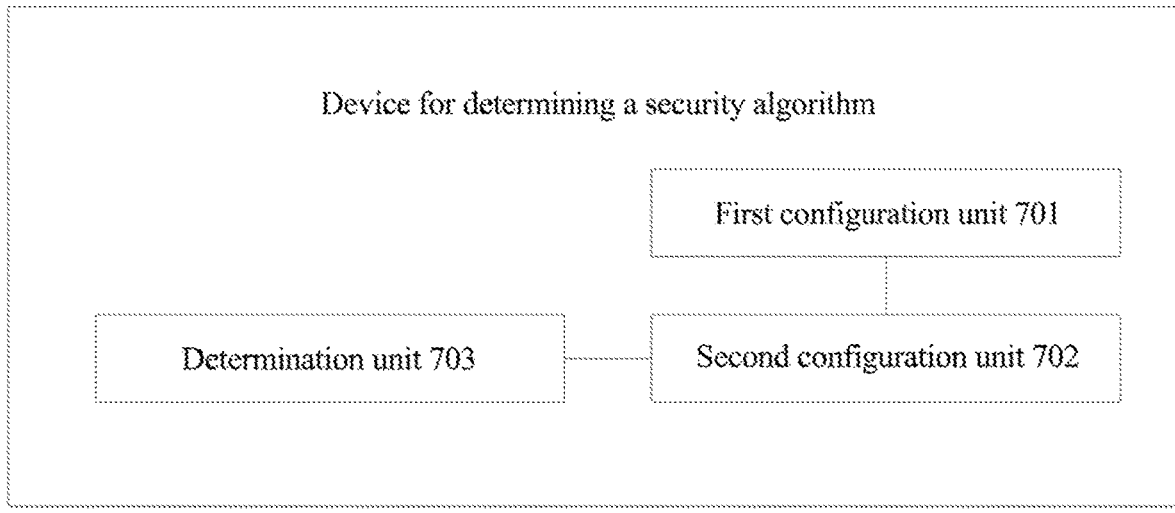
FIG. 7 is a first schematic diagram of structural composition of a device for determining a security algorithm according to an implementation of the present disclosure.

FIG. 7 is a first schematic diagram of structural composition of a device for determining a security algorithm according to an implementation of the present disclosure. As shown in FIG. 7, the device for determining the security algorithm includes a first configuration unit 701 and a second configuration unit 701.

The first configuration unit 701 is configured to configure a RAN notification area for a terminal, herein all base stations in the RAN notification area support at least a first security algorithm.

The second configuration unit 702 is configured to configure the terminal for the first security algorithm so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message.

In one implementation mode, the device further includes a determination unit 703.

The determination unit 703 is configured to determine whether the terminal supports the first security algorithm; if the terminal supports the first security algorithm, the second configuration unit 702 configures the terminal for the first security algorithm.

Those skilled in the art should understand that implementation functions of each unit in the device for determining the security algorithm shown in FIG. 7 may be understood with reference to relevant description of the aforementioned method for determining the security algorithm. The functions of each unit in the device for determining the security algorithm shown in FIG. 7 may be implemented by a program running on a processor or by a specific logic circuit.

Figure 8:
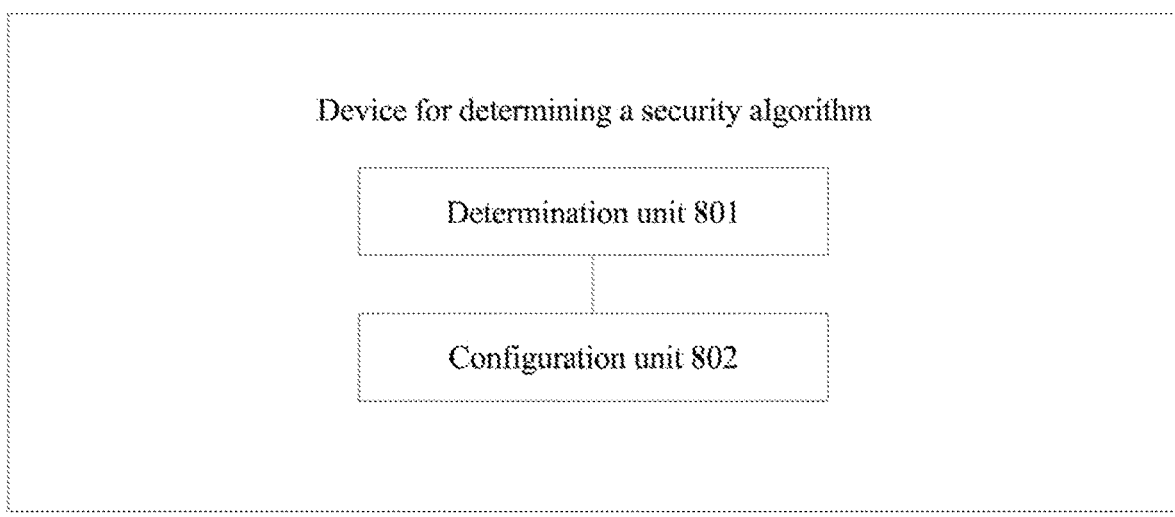
FIG. 8 is a second schematic diagram of structural composition of a device for determining a security algorithm according to an implementation of the present disclosure.

FIG. 8 is a second schematic diagram of structural composition of a device for determining a security algorithm according to an implementation of the present disclosure. As shown in FIG. 8, the device for determining the security algorithm includes a determination unit 801 and a configuration unit 802.

The determination unit 801 is configured to determine a first security algorithm currently supported by a terminal.

The configuration unit 802 is configured to configure a RAN notification area for the terminal based on the first security algorithm, herein all base stations in the RAN notification area support at least the first security algorithm, so that a second base station in the RAN notification area may adopt the first security algorithm to perform an integrity security protection on a radio resource control (RRC) connection resume message, and the terminal may adopt the first security algorithm to perform an integrity protection verification on the RRC connection resume message.

Those skilled in the art should understand that implementation functions of each unit in the device for determining the security algorithm shown in FIG. 8 may be understood with reference to relevant description of aforementioned method for determining the security algorithm. The functions of each unit in the device for determining the security algorithm shown in FIG. 8 may be implemented by a program running on a processor or by a specific logic circuit.

Figure 9:
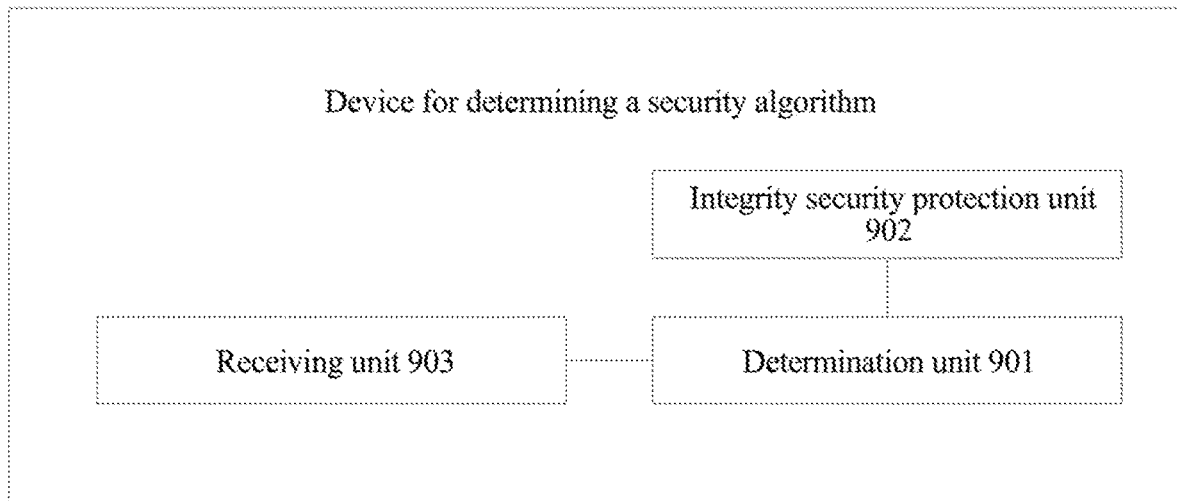
FIG. 9 is a third schematic diagram of structural composition of a device for determining a security algorithm according to an implementation of the present disclosure.

FIG. 9 is a third schematic diagram of structural composition of a device for determining a security algorithm according to an implementation of the present disclosure. As shown in FIG. 9, the device for determining the security algorithm includes a determination unit 901 and an integrity security protection unit 902.

The determination unit 901 is configured to determine whether a second base station supports the security algorithm of a terminal.

The integrity security protection unit 902 is configured to adopt a second security algorithm to perform an integrity security protection on an RRC connection resume message and send the RRC connection resume message to the terminal if the second base station does not support the security algorithm of the terminal, so that the terminal adopts the second security algorithm to perform an integrity protection verification on the RRC connection resume message; herein the second security algorithm is a security algorithm supported by all base stations.

In one implementation mode, the device further includes a receiving unit 903.

The receiving unit 903 is configured to receive an RRC connection resume request message sent by the terminal and acquire context information of the terminal from the first base station.

The determination unit 901 is configured to determine whether the second base station supports the security algorithm of the terminal according to the context information of the terminal.

In one implementation mode, the second security algorithm is specified by a protocol, configured by an RRC signaling, or broadcasted through SI.

Those skilled in the art should understand that implementation functions of each unit in the device for determining the security algorithm shown in FIG. 9 may be understood with reference to relevant description of the aforementioned method for determining the security algorithm. The functions of each unit in the device for determining the security algorithm shown in FIG. 9 may be implemented by a program running on a processor or by a specific logic circuit.

Figure 10:
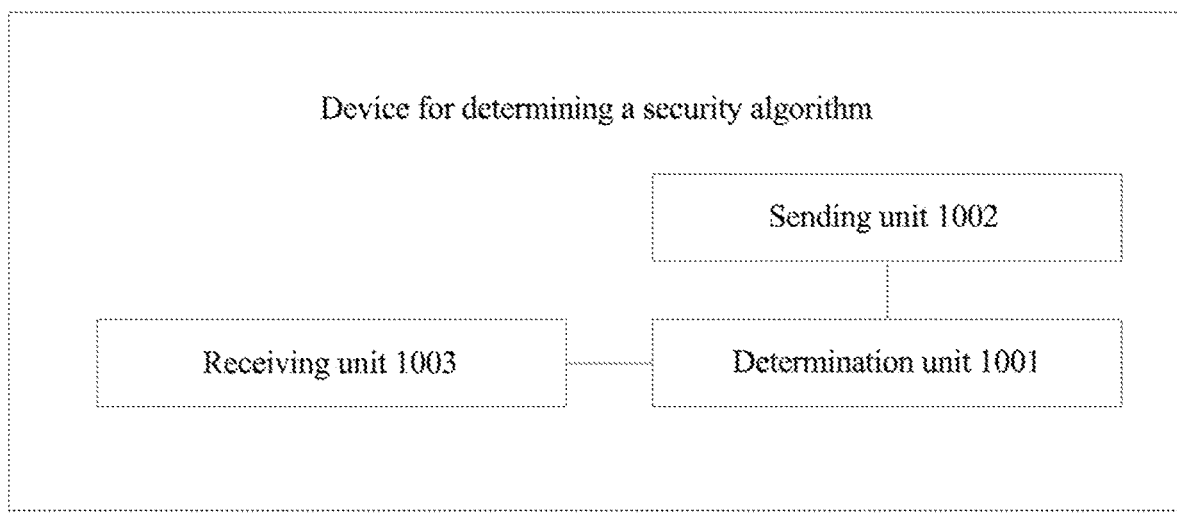
FIG. 10 is a fourth schematic diagram of structural composition of a device for determining a security algorithm according to an implementation of the present disclosure.

FIG. 10 is a fourth schematic diagram of structural composition of a device for determining a security algorithm according to an implementation of the present disclosure. As shown in FIG. 10, the device for determining the security algorithm includes a determination unit 1001 and a sending unit 1002.

The determination unit 1001 is configured to determine whether a base station supports the security algorithm of a terminal.

The sending unit 1002 is configured to send an RRC connection establishment message to the terminal if the second base station does not support the security algorithm of the terminal, in order for the terminal to reestablish an RRC connection.

In one implementation mode, the device further includes a receiving unit 1003.

The receiving unit 1003 is configured to receive an RRC connection resume request message sent by the terminal and acquire context information of the terminal from another base station.

The determination unit 1001 is configured to determine whether the second base station supports the security algorithm of the terminal according to the context information of the terminal.

Those skilled in the art should understand that implementation functions of each unit in the device for determining the security algorithm shown in FIG. 10 may be understood with reference to relevant description of the aforementioned method for determining the security algorithm. The functions of each unit in the device for determining the security algorithm shown in FIG. 10 may be implemented by a program running on a processor or by a specific logic circuit.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the invention also provides a computer storage medium in which computer executable instructions are stored, and when the computer executable instructions are executed by a processor, the above-mentioned method for determining the security algorithm of the implementation of the present disclosure is implemented.

Figure 11:
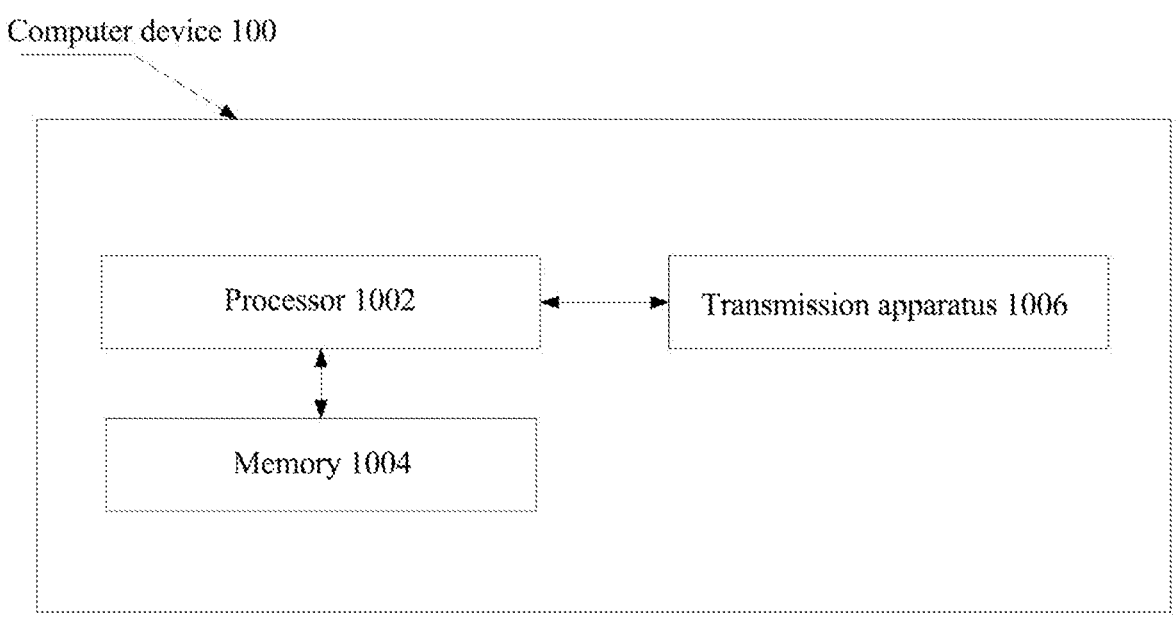
FIG. 11 is a schematic diagram of structural composition of a computer device according to an implementation of the present disclosure.

FIG. 11 is a schematic diagram of structural composition of a computer device according to an implementation of the present disclosure, and the computer device may be any type of base station. As shown in FIG. 11, a computer device 100 may include one or more (only one is shown in the figure) processors 1002 (the processors 1002 may include, but are not limited to, processing devices such as a microprocessor (MCU), a Micro Controller Unit (FPGA), a Field Programmable Gate Array, etc.), a memory 1004 for storing data, and a transmission apparatus 1006 for communication functions.

One of ordinary skill in the art may understand that the structure shown in FIG. 11 is only schematic and does not limit the structure of the above electronic device. For example, the computer device 100 may also include more or fewer components than shown in FIG. 11, or have a different configuration than that shown in FIG. 11.

The memory 1004 may be configured to store software programs and modules of application software, such as program instructions/modules corresponding to the method in an implementation of the present disclosure. The processor 1002 executes various functional applications and data processing by running the software programs and modules stored in the memory 1004, i.e., realizes the above method. The memory 1004 may include high-speed random access memory and may also include non-volatile memory such as one or more magnetic storage devices, flash memory, or other non-volatile solid-state memory. In some examples, the memory 1004 may further include memory remotely disposed with respect to the processor 1002, which may be connected to the computer device 100 through a network. Examples of the above networks include, but are not limited to, an Internet, an intranet, a local area network, a mobile communication network, and combinations thereof.

The transmission apparatus 1006 is configured to receive or transmit data via one network. Specific examples of the network described above may include a wireless network provided by a communication provider of the computer device 100. In one example, the transmission apparatus 1006 includes a network adapter (NIC), which may be connected to other network devices via a base station so as to communicate with the Internet. In one example, the transmission apparatus 1006 may be a Radio Frequency module, communicating with the Internet via a wireless manner.

The technical solutions described in implementations of the present disclosure may be combined arbitrarily without conflict.

In several implementations provided by the present disclosure, it should be understood that the disclosed methods and smart devices and the like may be implemented in other ways. The implementations of the terminal described above are only illustrative, for example, the division of the units is only a logical function division, and there may be other division manners in actual implementation. For example, multiple units or components may be combined or integrated into another system, or some features may be ignored or not executed. In addition, the mutual coupling or direct coupling or communication connection between various components shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in one processing unit, or various units may be physically present separately, or two or more units may be integrated in one unit. The above-mentioned integrated units may be implemented in a form of hardware or in a form of hardware plus software functional units.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure.

What is claimed is:

1. A method for determining a security algorithm, comprising:
configuring, by a first base station for a terminal, a radio access network (RAN) paging area, in which all base stations including the first base station and at least a second base station support at least a first security algorithm;
wherein, the RAN paging area comprises multiple cells, when the terminal moves in the RAN paging area, the terminal does not notify network side, and when downlink data for the terminal arrive, all cells in the RAN paging area send paging messages to the terminal if the terminal is in inactive state, to resume a RRC connection of the terminal for data transmission, wherein the first base station is an anchor base station of the terminal in the RAN paging area and the second base station is a serving base station of the terminal in the RAN paging area;
wherein configuring the RAN paging area comprises:
selecting base stations each of which supports the first security algorithm to configure the RAN paging area; and
wherein the terminal is configured with the first security algorithm by the first base station, so as to enable the second base station in the RAN paging area to adopt the first security algorithm to
perform an integrity security protection on a radio resource control (RRC) connection resume message, and
enable the terminal to adopt the first security algorithm so as to perform an integrity protection verification on the RRC connection resume message.

2. The method of claim 1, further comprising:
determining, by the first base station, whether the terminal supports the first security algorithm, wherein the terminal is configured for the first security algorithm in response to determining that the terminal supports the first security algorithm.

3. The method of claim 1, wherein the second base station is located in the RAN paging area and is different from the first base station.

* * * * *